(12) United States Patent
Snyder

(10) Patent No.: US 8,873,733 B1
(45) Date of Patent: Oct. 28, 2014

(54) REAL-TIME FEEDBACK OF SURVEY RESULTS

(75) Inventor: Richard K. Snyder, Macedonia, IA (US)

(73) Assignee: West Corporation, Omaha, NE (US)

( * ) Notice: Subject to any disclaimer, the term of this patent is extended or adjusted under 35 U.S.C. 154(b) by 1884 days.

(21) Appl. No.: 11/760,021

(22) Filed: Jun. 8, 2007

(51) Int. Cl.
*H04M 3/00* (2006.01)
*H04M 3/42* (2006.01)
*H04M 5/00* (2006.01)

(52) U.S. Cl.
USPC ............ 379/265.02; 379/212.01; 379/265.03; 379/265.06

(58) Field of Classification Search
USPC ............. 379/265.06, 265.01, 265.02, 265.03, 379/265.04, 265.05, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | | |
|---|---|---|---|---|
| 6,118,865 | A * | 9/2000 | Gisby | 379/265.02 |
| 6,175,833 | B1 | 1/2001 | West et al. | |
| 6,189,029 | B1 | 2/2001 | Fuerst | |
| 6,220,768 | B1 | 4/2001 | Barroux | |
| 6,377,567 | B1 * | 4/2002 | Leonard | 370/352 |
| 6,664,988 | B1 | 12/2003 | Rollins | |
| 6,728,755 | B1 | 4/2004 | de Ment | |
| 6,912,521 | B2 | 6/2005 | Kraft et al. | |
| 7,050,569 | B1 * | 5/2006 | Weaver et al. | 379/266.01 |
| 7,606,726 | B2 * | 10/2009 | Nelson | 705/7.32 |
| 7,609,832 | B2 * | 10/2009 | Kreiner et al. | 379/265.02 |
| 8,041,365 | B1 * | 10/2011 | Gentle et al. | 455/456.1 |
| 2002/0129138 | A1 | 9/2002 | Carter | |
| 2002/0184041 | A1 | 12/2002 | Muller | |
| 2002/0188777 | A1 | 12/2002 | Kraft et al. | |
| 2003/0163349 | A1 | 8/2003 | Ho | |
| 2003/0182135 | A1 * | 9/2003 | Sone | 705/1 |
| 2004/0153360 | A1 | 8/2004 | Schumann | |
| 2005/0100158 | A1 * | 5/2005 | Kreiner et al. | 379/265.02 |
| 2005/0100160 | A1 * | 5/2005 | Bae | 379/266.01 |
| 2005/0137922 | A1 | 6/2005 | Blackwood et al. | |
| 2005/0141693 | A1 * | 6/2005 | Stuart et al. | 379/265.06 |
| 2005/0147228 | A1 * | 7/2005 | Perrella et al. | 379/265.06 |
| 2006/0026054 | A1 | 2/2006 | Barel et al. | |
| 2007/0160054 | A1 * | 7/2007 | Shaffer et al. | 370/395.2 |
| 2007/0233549 | A1 * | 10/2007 | Watson et al. | 705/10 |
| 2009/0274289 | A1 * | 11/2009 | Bloch | 379/265.06 |

\* cited by examiner

*Primary Examiner* — Khai N Nguyen

(57) ABSTRACT

A system, method, and computer readable medium for feedback of survey results comprises a data center, a call center, and a survey platform communicably coupled to the data center and to the call center, wherein the data center receives a communication initiated by an individual, wherein the communication is routed to the survey platform after an event, wherein data related to at least one of: the individual and the communication is collected, wherein the individual is prompted for participation in a survey, if the individual agrees to participate in the survey, the data is routed to the call center, based on the data and information related to the individual, the individual is routed to an agent within a call center, wherein the agent conducts a survey, and wherein results of the survey are dynamically provided to quality control database.

20 Claims, 3 Drawing Sheets

REAL-TIME FEEDBACK OF SURVEY RESULTS

BACKGROUND OF THE INVENTION

The present invention describes a method by which customer call survey results can be collected, processed, and disseminated in real-time for immediate review and action by customer experience management. Idea is to establish an almost immediate feedback mechanism for customer survey results that can be utilized by quality management in improving the overall customer experience. In addition to call survey results, 100% of the Customer-Agent interaction is recorded for all surveys completed for immediate cross-reference and analysis.

In establishing client to business applications, successful customer telephony support is key to maintaining customer's loyalty. In Customer Call Center applications, research indicates that customers who call into call centers and have had a problem that has been effectively addressed are more loyal to the company than those customers who never had a problem.

Many methods to collect customer feedback exist in the market today. Some of these include post experience mailed surveys, follow-up call surveys, or on-line internet surveys. The problem with these types of customer experience data collection techniques is that they:

Are not stream-lined and real-time enough to address issues or take advantage of key learnings immediately, Do not provide the proper coaching of agents in real-time or in near real-time, Do not allow the customer to supply the appropriate feedback during the actual call center experience, Do not supply real-time feedback to customer quality management for tracking of trends/issues that may need to be addressed, and Do not have the ability to align survey results to actual Customer-Agent interaction recordings.

Therefore, what is needed to overcome the aforementioned limitation, is a system in which customers can supply survey results during their call center experience and these results can be captured, processed, and displayed in real-time for more effective customer call management quality and control.

SUMMARY OF THE INVENTION

The present invention, accordingly, provides a method by which a Survey Provider Platform can be integrated into the architecture of a Client's Data Center/Client's Call Center for collection of caller-agent voice recordings and caller survey data. When a customer dials a company's Customer Care toll-free number, the customer is routed to the Client Data Center. The Client Data Center supplies an Integrated Voice Response (IVR) system to customer for collecting data and routing call appropriately. Once customer completes IVR interaction, data gathered by Client Data Center is supplied to the Survey Provider Platform while call is routed from Client Data Center to Survey Provider Platform. Customer, once on the Survey Provider Platform, can then determine if they would like to participate in Survey via IVR interaction with the platform. More specifically, the customer is prompted via the IVR if they would like to be connected to an agent. Assuming participation, appropriate resources are allocated at the Survey Provider Platform for recording of Customer-Agent call, conference call is established between customer, Survey Provider Platform, and Client Call Center, customer is routed to the appropriate Client Call Center and assigned appropriate agent, and customer data is routed to Client Call Center via data interfaces between the Survey Provider Platform and Client Call Center for appropriate processing.

After Caller-Agent conversation is complete, call leg between the Survey Provider Platform and Client Call Center is dropped and Caller now interacts with IVR driven survey on Survey Provider Platform. The caller can also hit a dtmf key (eg, star) or any key that is configured, and return to the survey. this information is provided to the caller at any time before, during, or after the call. After completion of survey, caller terminates call and Survey Provider Platform consolidates collected survey data into the client survey database where the appropriate metrics are updated in real-time. This database feeds web-portals for client driven quality reports and metrics. Also, call recordings and customer messages (about their experiences and satisfaction levels) can be stored in such a database. Client Call Center Quality Management or another entity then uses data to increased customer satisfaction, drive agent behavior, and make real time adjustments on the production floor. Another benefit includes using the data to learn other valuable information about their business. For example, problems about a bill can be discovered and if pervasive, the entity utilizing the present invention can understand that this is a problem.

DETAILED DESCRIPTION OF THE INVENTION

In accordance with the principles of the invention, timely customer experience data collection and processing is critical in increasing customer satisfaction and driving continuous improvements in any business. In Client Call Center operations, it is imperative that the customer experience is satisfactory and the customer leaves the call with a sense of success in what they had called for in the first place. In order to gather timely customer feedback and be able to utilize that feedback in a timely manner, a Survey Provider Platform is integrated into the Client Data Center/Client Call Center architecture to collect customer survey data and record customer-agent interaction for linkage to customer surveys.

Figure 1:
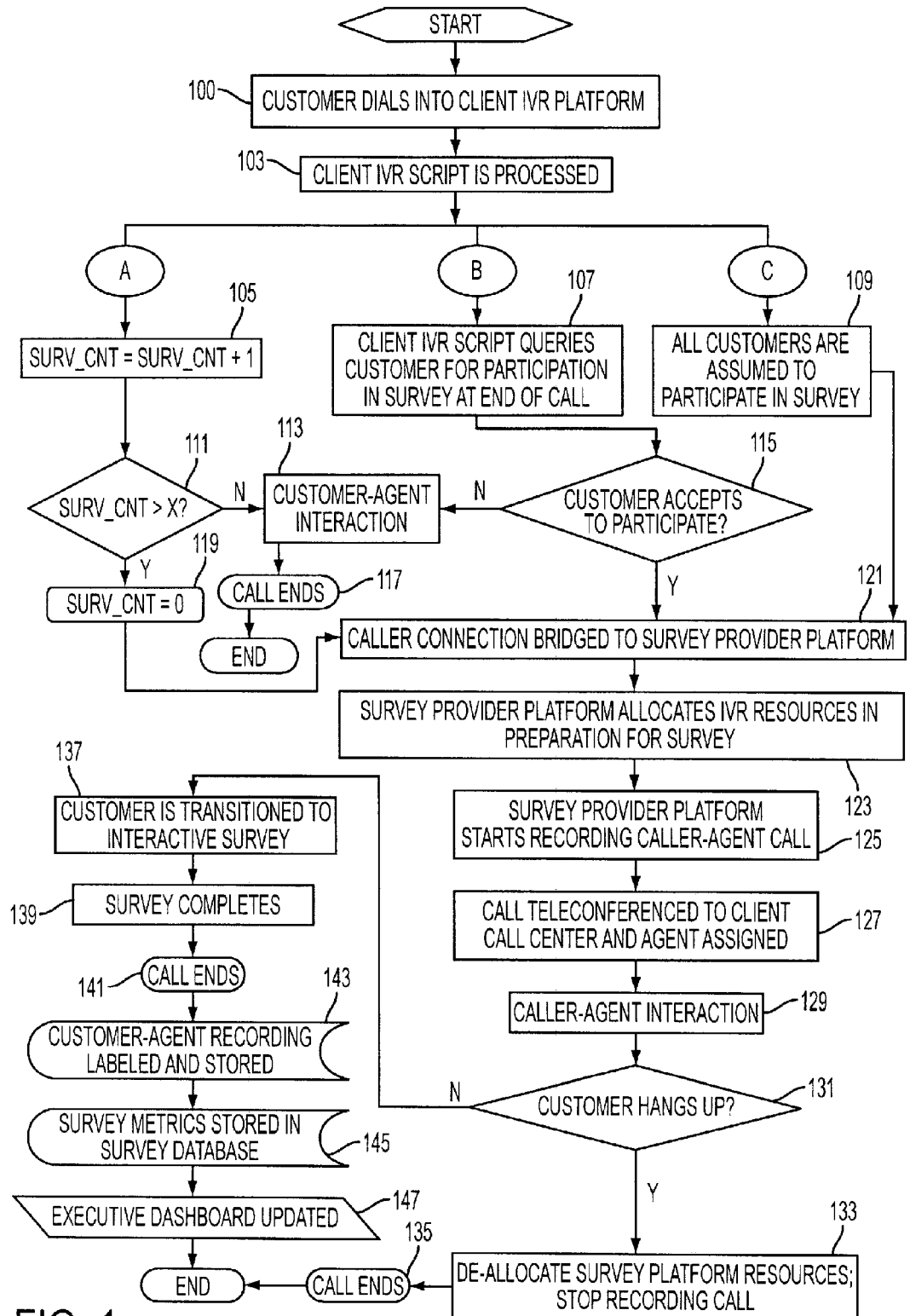
FIG. 1 depicts a typical flowchart of the process by which a caller is processed through the system and the survey data is collected in accordance with a preferred embodiment of the present invention.

With reference now to FIG. 1, a flowchart of a process of collecting survey data from a customer calling into a Client Call Center is depicted in accordance with a preferred embodiment of the present invention. In describing this process, it should be noted that this is a general description of the process and further implementation specifics will be represented in the following figures. The process begins when a customer dials into a Client's Integrated Voice Response (IVR) platform at the Client Data Center (Step 100). In other embodiments, "A", "B", and/or "C" can be accessed where calls are directly placed into a call center (with no welcome message or survey prompt). This can be by means of any telephony device known in the art ranging from a Plain Old Telephone System (POTS) device to an Internet Protocol VoIP terminal. This device is preferably capable of sending either voice signals to interact with voice recognition IVR systems or Dual Tone Multi-Frequency (DTMF) signals by pressing the appropriate buttons on the device. This device will be referred to as a "telephony device" throughout the remainder of this embodiment. Once the call is made, the appropriate routing occurs over the telephony network and the call is established with the Client Data Center's IVR system. At this point, the IVR script is processed and a suite of questions are asked to the customer and the customer responds by pressing specific keys on their telephony device.

Continuing to refer to FIG. 1, at this point in the process, the Client Data Center can implement the survey to customers in multiple ways. As referenced in FIG. 1, "A", "B", and "C" represent three methods for selecting which customers are asked to participate in the survey. "A" implements "one of every X participants" to participate where "X" is configurable on the Client Data Center platform (step 105). In other embodiments, surveys can be offered based on, for example, a percentage of total survey prompt offers, time of day, day of week, and number of survey accumulations. "B" is the process by which the customer is queried to determine if they are interested in taking the survey prior to being connected to the agent (step 107). In other embodiments, the process of the present invention can utilize path's "A" and "B" only or "C" only, or any combination of thereof. "C" is a process by which all customers are routed to the survey platform (step 109). In this reference, it will be assumed that the method by which the caller is routed to the survey platform is by method "B" (step 107). IVR script queries customer for participation in survey (step 115). If customer decides to not participate, the customer is routed to the appropriate agent for processing and the survey platform resources are not allocated to that call (step 113). If the customer decides to participate in the survey, the call is routed to the Survey Provider Platform (step 121). The Survey Provider Platform allocates the required IVR resources (step 123) and allocates resources for recording of the customer-agent call (step 125). From this point forward, the customer-agent call is recorded. At this point in the process, the customer and Survey Provider are teleconferenced with the Client Call Center so that all parties are linked together from a voice perspective (step 127). Recordings are captured even if a customer agrees to take a survey but the survey is ultimately not taken. Although depicted in a particular manner, the de-allocation of the survey platform resources and the cessation of the recording (step 133) can occur after the caller or customer to agent interaction (step 129). At any point during the Customer-Agent interaction (step 129) the agent is to hang up or the caller presses the star button, for example, (step 131), the Survey Platform resources are de-allocated and recording stops on the call. After the Customer-Agent interaction is complete, the customer is transitioned back to the interactive survey at the Survey Provider Platform (step 137). Verbatim recordings (such as a mailbox recording) is also available. The customer takes the survey by interacting with the IVR system via DTMF signaling on their telephony device. Speech recognition, natural language processing, and the like can also be employed with the present invention. When the survey is complete (step 139), the customer hangs up and the Survey Provider Platform de-allocates the resources associated with the call (step 141). The Survey Provider Platform then labels and stores the recording associated with the survey as well as the survey results in its database (steps 143, 145). The Survey Platform will then internally update the client's Executive Dashboard metrics and statistics with the survey results in real-time for usage by Client Quality Management/Agent Management.

Figure 2:
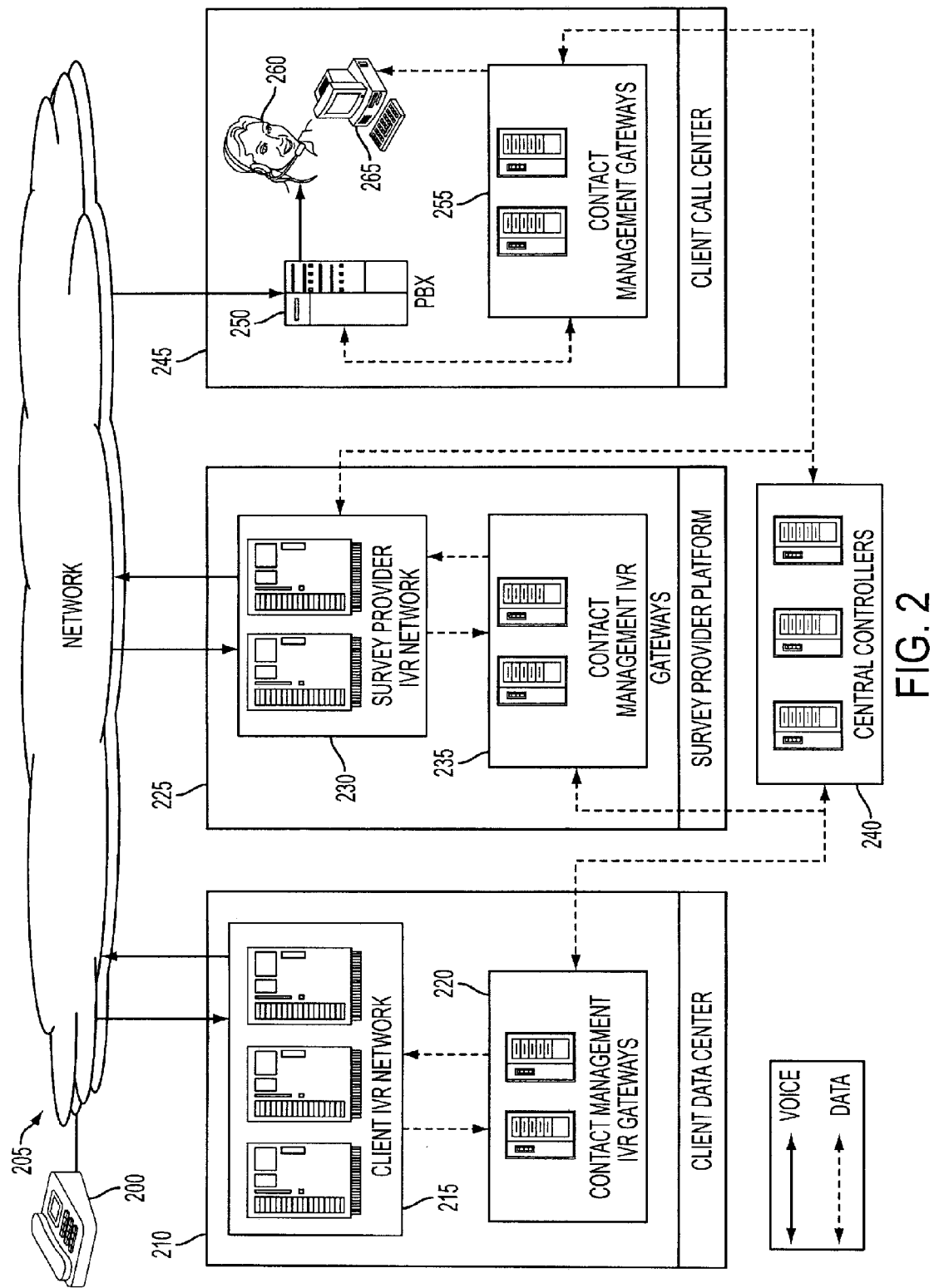
FIG. 2 depicts an integrated Client Data Center, Survey Provider Platform, and Client Call Center architecture and message flow in accordance with a preferred embodiment of the present invention.

With reference now to FIG. 2, an architectural reference diagram of a Client Data Center, Survey Provider Platform, and Client Call Center is depicted in accordance with a preferred embodiment of the present invention. Telephony Device 200 represents the device that the customer would use to access the company's customer care toll-free number. This device, as stated previously can be any form of telephony device capable of sending an appropriate voice signal for voice recognition IVR systems and/or DTMF signals for interacting with the customer care IVR system. This Telephony Device is beyond the scope of this invention. The Telephony Device 200 is connected to the public network which allows point to point connectivity between the customer and customer care center. This network can be either data, voice, or both data and voice. For simplicity purposes, FIG. 2 will assume this network is the Public Switched Telephone Network (PSTN). The PSTN, through routing tables and translation matrices, allows calls from customer to be routed directly to the Client Data Center 210. The Client Data Center is the location where all customers' initial calls are routed. It is made up of a Client IVR Network 215 which supplies the Integrated Voice Response (IVR) interaction to the customer and a Contact Management IVR Gateway 220 which is utilized to consolidate customer data, route that data to the Survey provider Platform, and communicate back with the Client IVR Network 215 in directing it on how to process customer call after initial IVR interaction is complete.

Continuing with the reference to FIG. 2, the Survey Provider Platform 225 is the device that supplies the customer survey. It should be understood that the Survey Provider Platform 225 can reside at the Client's site, at the Survey Provider site, or in any other area. In this example, the Survey Provider Platform is represented at the Survey Provider site. The Survey Provider site can be any site away from the Client's site. The Survey Provider Platform contains the Survey Provider IVR Network 230 and the Contact Management IVR Gateways 235. The Survey Provider IVR Network 230 supplies the connectivity to the public network for routing customers to the survey platform. It can receive customer collected data for this call as well as Call Center routing data from the Contact Management IVR Gateways. The Survey Provider IVR Network is the device that will prompt the caller for participation in the survey before being connected to an agent. Data collection by the Survey Provider IVR Network is shared with Contact Management IVR Gateway for survey setup, resource allocation, processing of survey, and manipulation of survey results. Contact Management IVR Gateways 235 receive route requests from Survey Provider IVR Network and supplies routing information for appropriate route of customer to allocated call center. Contact Management IVR Gateways 235 also receives customer specific call information from the Client Data Center's Contact Management IVR Gateways 220. This data is fed to the Survey Provider Platform via the Central Controllers 240.

The Central Controllers 240 in FIG. 2 represent the main resource allocation and data processing device within the referenced architecture. It collects data associated with each customer's calls, allocates resources based on round-robin and load balancing algorithms for the appropriate distribution of call center resources, and collects survey results for post processing and data feeds to customer premise. The Central Controllers 240 can reside at the Client site, at the Survey Provider site, or any other site. The Central Controllers are fed customer specific call information from the Client Data Center 210, call center availability from the Client Call Center 245, and survey results data from the Survey Provider Platform 225 components. The Central Controllers process this information and supply the proper routing and resource allocation to the survey provider platform so that the customers can be directed to the appropriate call center based on the customer's needs, shortest path routing, and best geographical assignment of the call. In post processing the survey results of a specific call, the Central Controllers can consolidate the appropriate information into the survey results to link the customer data, survey results, associated agent information, and customer-agent recording details into the outgoing reports to the Client's Quality Control System for immediate update of quality control databases and web portals.

Continuing with the reference to FIG. 2 and with specific reference to Client Call Center 245, this device within the referenced architecture is where all customer calls are assigned and interfaced to an agent for processing. It should be noted that multiple Client Call Centers 245 can exist in the referenced architecture and can be distributed anywhere geographically in the world. The Client Call Center 245 consists of a telephony subsystem that allows voice call processing and routing. This subsystem can be a Public Branch Exchange (PBX), Automatic Call Distribution Center (ACD), or similar device. For this embodiment, it will be assumed that this device is a PBX 250. The PBX 250 receives the incoming customer call and routes that call to the appropriate Agent 260 based on routing data and customer supplied data from the Contact Management Gateway 255. The Contact Management Gateways 255 supply routing data to the PBX for routing to the assigned Agent 260 as well as supplying the customer specific data to the Agent's Desktop 265. The customer specific data supplied to the agent's desktop is made up of customer's initial IVR input into the system—supplied by the Client Data Center 210- and stored customer historical data from the Central Controllers 240.

Figure 3:
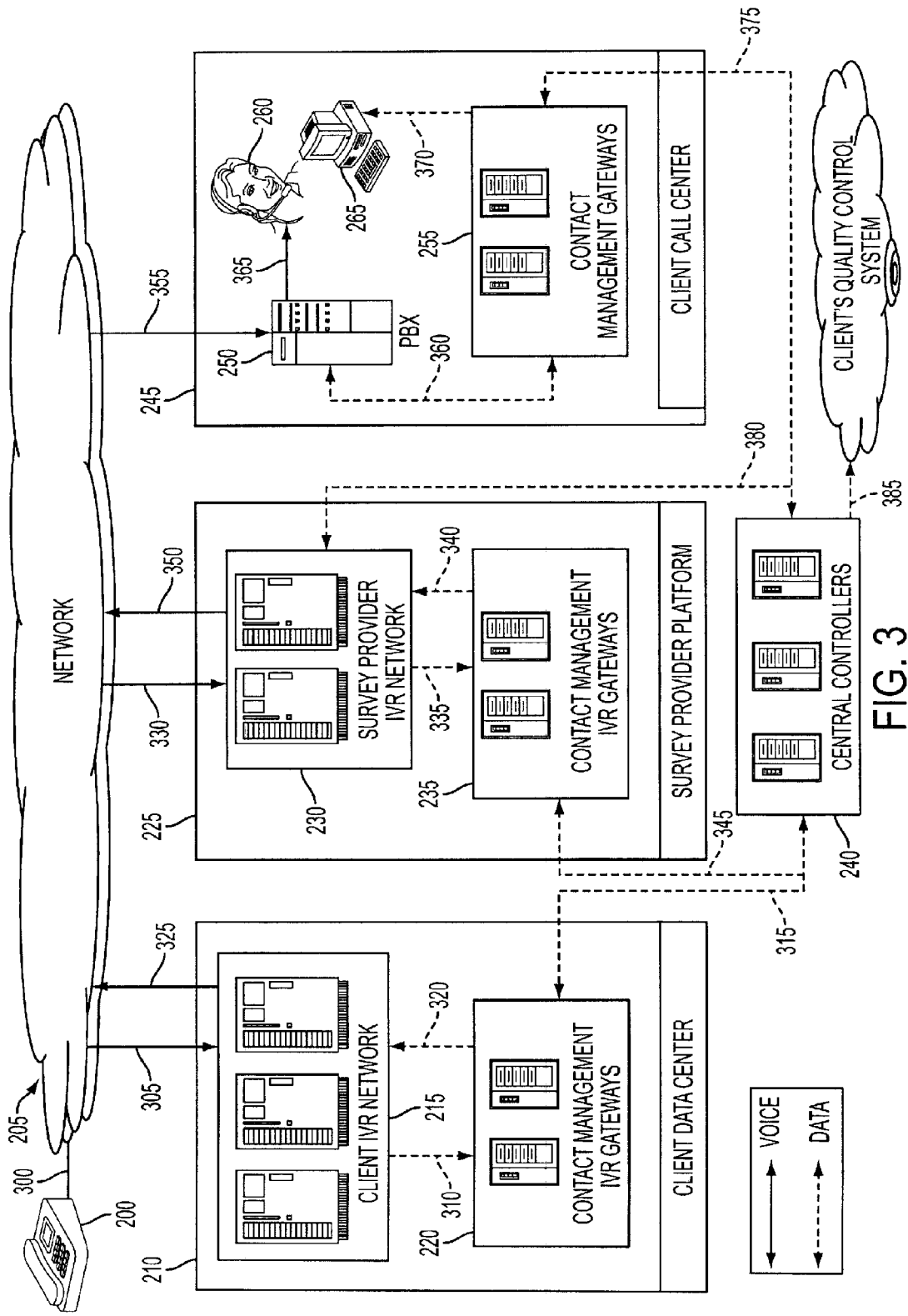
FIG. 3 depicts an alternate architecture and message flow for collecting survey information at the Survey Provider Platform in accordance with a preferred embodiment of the present invention.

With reference now to FIG. 3, an inter-connectivity diagram of a Client Data Center, Survey Provider Platform, and Client Call Center is depicted in accordance with a preferred embodiment of the present invention. This diagram is a representative example of how this embodiment may be implemented within a call center architecture. In the depicted example, Client Data Center 210, Survey Provider Platform 225, Client Call Center 245 and Central Controllers 240 are all inter-connected in order to share information within the overall Call Center architecture. Interfaces 300, 305, 325, 330, 350, 355, and 360 represent the voice connectivity of the embodiment. In this illustration, these interfaces use standard Signaling System 7 (SS7) protocols with T1 line trunking for carrying voice—both well known in the art. The international version of SS7 and E1 interfaces can be used in the same manner. These interfaces can be embedded into packet data protocols as well such as Asynchronous Transfer Mode (ATM) transports.

Interfaces 310, 315, 320, 335, 340, 345, 360, 370, 380, and 385 represent the data interfaces used to exchange key information between and within platforms. These physical interfaces are Ethernet or similar interfaces well known in the art for data communication standards. These interfaces may use any application layer IP protocol for inter-system communications. As with any standard data network, routers would be used to route the appropriate information to the appropriate entity. The customer's data network, whether consolidated into a single location, or distributed geographically throughout the world, is beyond the scope of this embodiment.

Continuing with the reference to FIG. 3, Customer 200 would dial the Customer Care Toll-Free number. Network 205 would route this call to the Client Data Center 210 over interface 305 into the Client IVR Network 215. Customer would then be presented with several options via a standard IVR script. Customer 200 responds to prompts from the Client IVR Network 215 with DTMF signals in order to answer the appropriate questions. When Customer completes the IVR script, the Client IVR Network 215 would send a route request to the Contact Manager IVR Gateways 220 requesting routing information to direct caller to the appropriate call center. Route request would also contain customer information as well as IVR script responses. The Contact Management IVR Gateway 220 forwards route request to the Central Controllers 240 over interface 315. Central Controllers 240 determines if Survey required for this call (FIG. 1 Steps A, B, or C). Assuming Survey required, Central Controllers 240 supplies routing data for the Survey Provider Platform 225. Survey Database record is created in Central Controller for data collection for this call. The route request response contains the routing data to the Survey Provider Platform. This data is sent back to both Contact Management IVR Gateways (220, 235) at both the Client Data Center and Survey Provider Platform over interfaces 315 and 345. Contact Management IVR Gateway 235 sends this information to the Survey Provider IVR Network over interface 340. Survey Provider IVR Network establishes and allocated destination end-point for customer to connect to. Contact Management IVR Gateway 220 forwards route response based to Client IVR Network. Client IVR Network then uses Transfer Connect message to route customer to Survey Provider Platform over interface 325. Network 205 delivers customer to Survey provider IVR Network Upon customer arriving at Survey Provider Platform 230, a route request is submitted to the Central Controller 240, through the Contact Management IVR Gateway 235, requesting call routing data for call center assignment. The route request response from the Central Controllers 240 contains the routing data to Client Call Center and agent assignment information (Agent ID, dept, code, Survey Database Record ID). This same information is supplied to the Client Call Center 245 Contact Management Gateway 255 over interface 375. Contact Management Gateway 255 utilizes assigned Agent ID number in route request response to route this information to the assigned Agent's Desktop 265 over interface 370. At the same time, customer is given initial survey information via IVR script at Survey provider IVR Network 230. If customer decides not to take the survey for any reason, the customer indicates as such in IVR interaction via DTMF signaling. The Survey resource assignment will be canceled, the customer is then routed to the Client Call Center 245 via a Transfer Connect message, and the connection from the customer to the Survey Provider Platform is released. If customer still continues with survey (indicated via DTMF interaction with IVR script), the Survey Provider IVR Network allocates the recording resource and Survey IVR script resource and uses a conference function to route call to Client Call Center 245. This allows recording of the Customer-Agent discussion during the call. Survey Provider IVR Network 230 also starts a customer record in survey database to capture information related to call (Agent ID, Dept, Code, IVR feedback).

Interface 355 delivers customer to PBX 250. With the use of translations and routing tables, the PBX 250 matches the assigned Agent ID to the appropriate Agent 260 and connects the call. Agent 260 and Customer 200 start exchanging information. Agent 260, at this point in the process, also has all relevant customer information at Agent Desktop 265.

Continuing with the reference to FIG. 3, once Customer-Agent conversation completes, Agent 260 is dropped from call path and Customer 200 and Survey Provider IVR Network 230 are still in call. Survey Provider IVR Network 230 supplies survey to customer. Customer interacts with survey via DTMF signals from customer's telephony device. At any time during the survey, the customer is told they can enter a specific DTMF sequence for direct access to client's quality control management. This would be for escalation purposes and allows customer to discuss issues directly with management. Process for call routing would be the same as initial routing and Survey Provider IVR Network would continue to record conversations.

Once customer disconnects from the Survey IVR script and ends call, Survey Provider IVR Network 230 stops recordings, labels recording with unique identifier, stores recording in recordings database, and updates the survey database record with customer IVR response information and customer-agent recording ID and location. All information in database record is then transferred to the Central Controllers over interface 380 where master Survey database record is stored. Any additional client specific processing can take place on gathered information from Survey as requested from client. At this point in the process, the Agent 260, utilizing the Survey Database Record, can also supply feedback from the call into the record and send this information back to the Central Controllers 240 for inclusion in the overall Survey Record. Survey record is then fed to Client's Quality Control System via interface 385. Client uses Survey data to feed real time metrics tracking software that continually update metrics on an on-going basis for overall measurement of customer satisfaction and Call Center success.

In one embodiment of the present invention, a system for feedback of survey results, comprises a data center, a call center, and a survey platform communicably coupled to the data center and to the call center, wherein the data center receives a communication initiated by an individual, wherein the communication is routed to the survey platform after an event, wherein data related to at least one of: the individual and the communication is collected, wherein the individual is prompted for participation in a survey, if the individual agrees to participate in the survey, the data is routed to the call center, based on the data and information related to the individual, the individual is routed to an agent within a call center, wherein the agent conducts a survey, and wherein results of the survey are dynamically provided to quality control database.

With respect to the system, the communication is at least one of: a telephone call, a text message, a voice message, an email, and a multi-media message, wherein the individual is prompted for participation in a survey that is at least one of: related to the communication and not related to the communication, wherein the individual is routed to the agent based on at least one of: a need of the customer; shortest path routing, and best geographical assignment of the communication. The system comprises central controllers communicably coupled to the data center, the call center, and to the survey platform, wherein the central controllers consolidate responses from the survey into the survey results and link the results to customer data, associated agent information, and customer-agent recording details into an outgoing report to a quality control system located apart from the survey platform, wherein the agent is located at a facility other than the call center, wherein the data is routed to the facility, and wherein the facility is at least one of: a home, an office, a car, and any location able to send and receive information via an electronic device, and wherein the data center includes an Integrated Voice Response (IVR) network which provide an initial interaction to the individual and a contact management IVR gateway which consolidates the individual's data, routes the data to the survey platform, and directs the IVR network on how to further process the communication after the initial IVR interaction is complete, wherein the IVR network and the contact management IVR gateway are communicably coupled.

With respect to the system, the survey platform supplies the survey to the individual via a survey provider IVR network and contact management IVR gateways, wherein the survey provider IVR network and the contact management IVR gateways are communicably coupled and are included in the survey platform, and wherein the survey provider IVR network supplies connectivity to a public network for routing the individual to the survey platform, wherein the survey provider IVR network receives data related to the individual and call center routing data from the contact management IVR gateways, and wherein the survey provider IVR network prompts the individual for participation in the survey before being connected to the agent, wherein the data is shared with the contact management IVR gateway in order to setup the survey, allocate resource in order to be able to conduct the survey, process the survey, and manipulate the survey results, wherein the contact management IVR gateways receive route requests from the survey provider IVR network and supply routing information to route the communication to the call center, wherein the contact management IVR gateways receive individual specific call information from the contact management IVR gateways, and wherein the data is provided to the survey platform via the central controllers.

With respect to the system, the central controllers collect data associated with the individual's calls, allocates resources based on round-robin and load balancing techniques for an appropriate distribution of call center resources, and collects survey results for post processing, wherein the central controllers are provided with: specific call information related to the individual from the data center, call center availability from the call center, and survey results data from the survey provider, wherein the central controllers process this information and supply proper routing and resource allocation to the survey platform so the communication can be directed to the appropriate call center based on the individual's needs, shortest path routing, and best geographical assignment of the call, wherein the central controllers, in post processing the survey results of the communication, consolidate appropriate information related to the communication into the survey results, wherein the call center includes a contact management gateway and a telephony subsystem that receives the communication and routes the communication to the agent based on routing data and data supplied by the individual from the contact management gateway which supplies routing data to the telephony subsystem for routing to the agent as well as supplies the customer specific data to a monitor used by the agent, wherein the monitor is associated with at least one of: as desktop computer, a laptop computer, a wireless device, and a mobile device, and wherein the data supplied to the agent includes the individual's initial IVR input into the IVR network and stored historical data related to the individual in the central controllers.

In another embodiment of the present invention, a method for collecting survey data from a customer comprises connecting a call initiated by the customer to an Integrated Voice Response (IVR) platform, processing an IVR script by asking the customer questions and receiving responses from a telephony device manipulated by the customer, based on the processing, querying the customer to determine if the customer is interested in taking a survey prior to being connected to a live agent, if the customer is interested, routing the call to a survey platform that allocates required IVR resources and allocates resources for recording a communication between the customer and the agent, recording, labeling, and storing results of the communication by the survey platform, and updating a client's monitor with the results in real-time. The client uses the result for at least one of: quality management, and agent management. The method further comprises contemporaneously routing the call to the agent while the customer is provided with initial information about the survey.

In a further embodiment of the present invention, a computer readable medium comprises instructions for: routing a customer communication to a survey platform, sending a route request requesting call routing data for a call center assignment, receiving a route request response that includes the routing data to the call center and agent assignment information that includes an agent identifier and a survey database record identifier, sending the routing data and the agent assignment information to a management platform, and sending information to the agent based on the customer and the communication.

The description of the present invention has been presented for purposes of illustration and description, but is not intended to be exhaustive or limited to the invention in the form disclosed. Many modifications and variations will be apparent to those of ordinary skill in the art. For example, although the processes and apparatus of present invention are illustrated utilizing three different and unique platforms (Client Data Center, Survey provider Platform, and Client Call Center), the processes and apparatus of the present invention may be implemented in other types of networks and protocols. For example, the present invention may be illustrated in a single platform architecture where all call center and survey provider platforms resided in a single entity. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for feedback of survey results, comprising:
    a data center;
    a call center; and
    a survey platform communicably coupled to the data center and to the call center;
    wherein the data center receives a communication initiated by an individual;
    wherein the communication is routed to the survey platform after an event;
    wherein data related to at least one of: the individual and the communication is collected;
    wherein the individual is prompted for participation in a survey;
    if the individual agrees to participate in the survey, the data is routed to the call center;
    based on the data and information related to the individual, the individual is routed to an agent within a call center;
    wherein the agent conducts a survey;
    wherein results of the survey are dynamically provided to quality control database;
    wherein the survey platform processes a key sequence entered by the individual during the survey; and
    wherein the key sequence is configured to escalate a quality control issue.

2. The system of claim 1, wherein the communication is at least one of: a telephone call, a text message, a voice message, an email, and a multi-media message.

3. The system of claim 1, wherein the individual is prompted for participation in a survey that is at least one of:
    related to the communication; and
    not related to the communication.

4. The system of claim 1, wherein the individual is routed to the agent based on at least one of: a need of the customer; shortest path routing, and best geographical assignment of the communication.

5. The system of claim 1 comprising central controllers communicably coupled to the data center, the call center, and to the survey platform, wherein the central controllers consolidate responses from the survey into the survey results and link the results to customer data, associated agent information, and customer-agent recording details into an outgoing report to a quality control system located apart from the survey platform.

6. The system of claim 1, wherein the agent is located at a facility other than the call center, wherein the data is routed to the facility, and wherein the facility is at least one of: a home, an office, a car, and any location able to send and receive information via an electronic device.

7. The system of claim 1, wherein the data center includes an Integrated Voice Response (IVR) network which provide an initial interaction to the individual and a contact management IVR gateway which consolidates the individual's data, routes the data to the survey platform, and directs the IVR network on how to further process the communication after the initial IVR interaction is complete, wherein the IVR network and the contact management IVR gateway are communicably coupled.

8. The system of claim 5, wherein the survey platform supplies the survey to the individual via a survey provider IVR network and contact management IVR gateways, wherein the survey provider IVR network and the contact management IVR gateways are communicably coupled and are included in the survey platform, and wherein the survey provider IVR network supplies connectivity to a public network for routing the individual to the survey platform.

9. The system of claim 8, wherein the survey provider IVR network receives data related to the individual and call center routing data from the contact management IVR gateways, and wherein the survey provider IVR network prompts the individual for participation in the survey before being connected to the agent.

10. The system of claim 9, wherein the data is shared with the contact management IVR gateway in order to setup the survey, allocate resource in order to be able to conduct the survey, process the survey, and manipulate the survey results.

11. The system of claim 10, wherein the contact management IVR gateways receive route requests from the survey provider IVR network and supply routing information to route the communication to the call center, wherein the contact management IVR gateways receive individual specific call information from the contact management IVR gateways, and wherein the data is provided to the survey platform via the central controllers.

12. The system of claim 5, wherein the central controllers collect data associated with the individual's calls, allocates resources based on round-robin and load balancing techniques for an appropriate distribution of call center resources, and collects survey results for post processing.

13. The system of claim 5, wherein the central controllers are provided with: specific call information related to the individual from the data center, call center availability from the call center, and survey results data from the survey provider, wherein the central controllers process this information and supply proper routing and resource allocation to the survey platform so the communication can be directed to the appropriate call center based on the individual's needs, shortest path routing, and best geographical assignment of the call.

14. The system of claim 5, wherein the central controllers, in post processing the survey results of the communication, consolidate appropriate information related to the communication into the survey results.

15. The system of claim 5, wherein the call center includes a contact management gateway and a telephony subsystem that receives the communication and routes the communication to the agent based on routing data and data supplied by the individual from the contact management gateway which supplies routing data to the telephony subsystem for routing to the agent as well as supplies the customer specific data to a monitor used by the agent, wherein the monitor is associated with at least one of: as desktop computer, a laptop computer, a wireless device, and a mobile device.

16. The system of claim 15, wherein the data supplied to the agent includes the individual's initial IVR input into the IVR network and stored historical data related to the individual in the central controllers.

17. A computer-implemented method for collecting survey data from a customer, comprising:
 a computer connecting a call initiated by the customer to an Integrated Voice Response (IVR) platform;
 the computer processing an IVR script by asking the customer questions and receiving responses from a telephony device manipulated by the customer;
 based on the processing, the computer querying the customer to determine if the customer is interested in taking a survey prior to being connected to a live agent;
 if the customer is interested, the computer routing the call to a survey platform that allocates required IVR resources and allocates resources for recording a communication between the customer and the agent;
 the computer recording, labeling, and storing results of the communication by the survey platform;
 the computer updating a client's monitor with the results in real-time
 wherein the computer processes a key sequence entered by the customer during the survey; and
 wherein the key sequence is configured to escalate a quality control issue.

18. The computer-implemented method of claim 17, wherein the call is routed to the agent based on at least one of: a need of the customer; shortest path routing, and best geographical assignment of the communication.

19. The computer-implemented method of claim 17, further comprising the computer contemporaneously routing the call to the agent while the customer is provided with initial information about the survey.

20. A non-transitory computer readable medium comprising instructions for:
 routing a customer communication to a survey platform;
 sending a route request requesting call routing data for a call center assignment;
 receiving a route request response that includes the routing data to the call center and agent assignment information that includes an agent identifier and a survey database record identifier;
 sending the routing data and the agent assignment information to a management platform;
 sending information to the agent based on the customer and the communication; and
 receiving a key sequence entered by a customer associated with the customer communication during a survey wherein the key sequence is configured to escalate a quality control issue.

* * * * *